Sept. 25, 1934.   M. P. MARONG   1,974,873
TIRE CHAIN HOOK AND REPAIR LINK
Filed Nov. 9, 1933   2 Sheets-Sheet 1

Inventor
Michael P. Marong
By Clarence A. O'Brien
Attorney

Sept. 25, 1934. M. P. MARONG 1,974,873
TIRE CHAIN HOOK AND REPAIR LINK
Filed Nov. 9, 1933 2 Sheets-Sheet 2

Inventor
Michael P. Marong

By Clarence A. O'Brien
Attorney

Patented Sept. 25, 1934

1,974,873

UNITED STATES PATENT OFFICE 1,974,873

TIRE CHAIN HOOK AND REPAIR LINK

Michael P. Marong, Warsaw, N. Y.

Application November 9, 1933, Serial No. 697,336

1 Claim. (Cl. 59—85)

This invention relates to a combined automobile tire chain hook and repair link.

One of the objects of the invention is to provide a device of the character referred to that will fasten the confronting links of a chain together, the mechanical construction of which is devised to eliminate undue wear and tear on the fabric of the automobile tire; and that may be expeditiously used as a repair link for side chains in the anti-skid chain used on automobiles.

With the foregoing and other features in view the invention consists of a novel combination, construction, and arrangement of parts as will be hereinafter more specifically described and illustrated in the accompanying drawings, but it is to be understood that changes, variations and modifications may be resorted to without departing from the spirit of the claim hereunto appended.

In the drawings wherein like reference characters denote corresponding parts throughout the several views.

Figure 1:
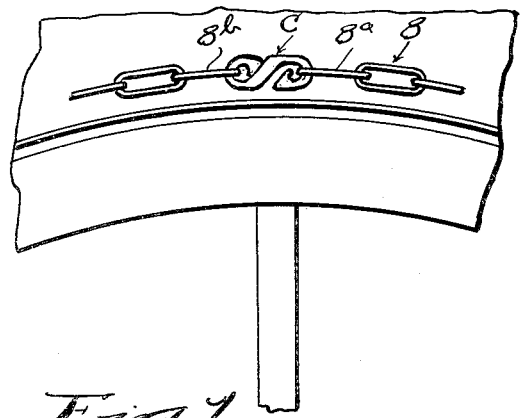
Figure 1 is a fragmentary portion in side elevation of an automobile wheel showing an adaptation of the present invention therewith.
Figure 2:
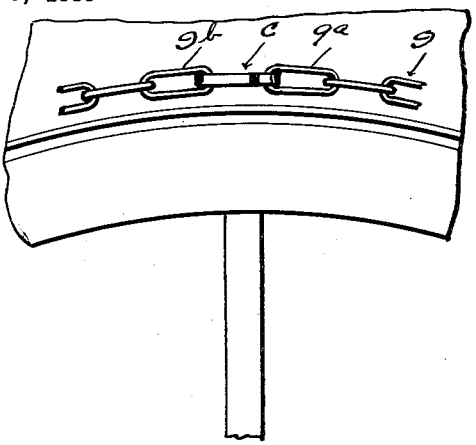
Figure 2 is a view similar to Figure 1 showing another adaptation of the present invention.
Figure 3:
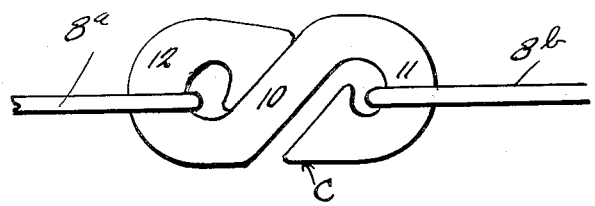
Figure 3 is an enlarged side elevation of the combined automobile tire chain hook and repair link of the present invention with one end of the body portion hammered in, and further illustrating the invention under tension.

The combined automobile tire chain hook and repair link of the present invention is utilized to secure the ends of an anti-skid chain together as illustrated in Figure 1. The invention indicated at C is applied as a hook to secure the confronting links 8a and 8b of side chains 8 together, where the planes of the links 8a and 8b are horizontal, and the plane of the combined hook and link C is vertical. In Figure 2, the combined hook and link C has the plane thereof disposed horizontally connecting the confronting links 9a and 9b of the side chains 9 together, which links are disposed with their planes horizontal. Owing to the novel construction and temper of the metal body portion of the combined hook and link C it may be used with its plane disposed in a horizontal or a vertical position without injury to the automobile tire. Furthermore, the combined hook and link C of the present invention, while illustrated in assembly on side chains finds equal utility for use as a repair link on side chains on automobile anti-skid chains.

The combined hook and tire chain C is formed with an S-shaped body portion of metal, preferably steel of sufficient ductile properties to withstand concussion used in hammering the leg as will hereafter appear. The body portion has a curved leg 11 at one end, a curved leg 12 at the other end and both legs merge with an intermediate diagonal portion 10 to form a unitary structure. The thickness of the body portion is sufficient to resist twisting about the intermediate portion while in use and all parts lie in the same plane.

Figure 4:
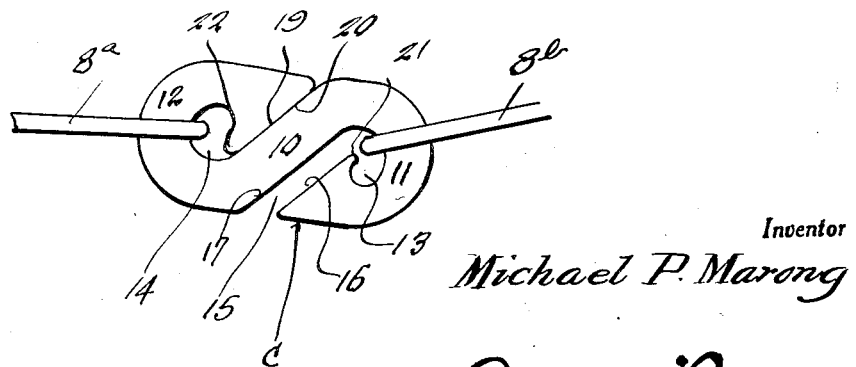
Figure 4 is a view similar to Figure 3 showing the position of the invention when there is slack in the side chains.
Figure 5:
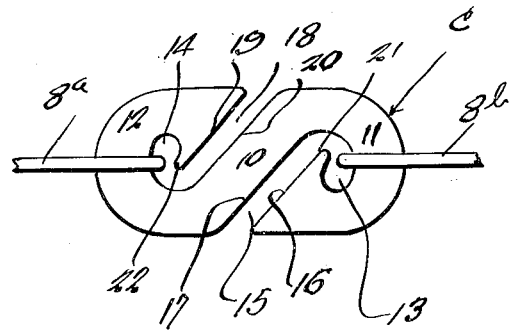
Figure 5 is a side elevation of the invention prior to hammering one end thereof and showing the device connected to the confronting links of a chain.
Figure 6:
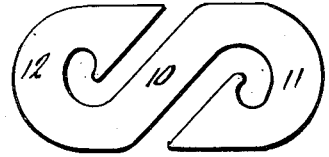
Figure 6 is a side elevation of the invention without being connected to the confronting links of the chain.
Figure 7:
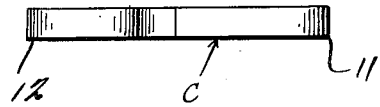
Figure 7 is an edge elevation thereof.

There is a substantially round opening 13 formed by the inner curvature of leg 11, and another like opening 14 formed by leg 12. A diagonal slot 15 leads into opening 13 bounded by the relatively elongated edge 16 of leg 11 and one edge 17 of intermediate portion 10. A diagonal slot 18 enters into opening 14 in a direction opposed to slot 15. The slot 18 is bounded by the relatively elongated edge 19 on the end of leg 12 and the other edge 20 of intermediate portion 10. Edges 16 and 17 are parallel with each other and edges 19—20 are parallel with each other. The width of slots 15 and 18 are sufficient in size initially to accommodate the insertion or removal of the conventional links on anti-skid chains for automobiles and these slots are parallel.

Where the slots 15 and 18 merge with the respective openings 13 and 14, the ends of the legs are formed with restricting abutments or knobs 21 and 22 respectively. These abutments 21 and 22 are on a line with the plane of the pull through the links of the chain and prevent the respective links 8b and 8a from jumping out of the openings 11 and 14 when there is slack in the chain as illustrated in Figure 4. When the confronting links 8a and 8b are inserted through the respective slots 18 and 15 into the respective openings 14 and 13, the leg 12 is hammered until the parallel edges 19 and 20 meet, thereby anchoring one link 8a to the body portion and leaving links 8b that may be detachable from opening 11. It is not necessary to hammer slot 18 until the confronting parallel edges 19 and 20 meet so long as the slot is sufficiently narrowed to prevent link 8a from passing therethrough.

With a combined automobile tire chain hook and repair link constructed in accordance with the foregoing, I have contributed a device which is very strong, compact and durable, thoroughly reliable for its intended purpose, that is easily assembled and disassembled from the anti-skid chains and that is comparatively inexpensive to manufacture and use.

Having described my invention, what I claim is:

A combined tire chain hook and repair link comprising a ductile metal S-shaped body portion consisting of a hookline portion at each end merging with a diagonal intermediate portion, said body portion being of sufficient thickness to resist torsion about the intermediate portion, said body portion formed with parallel slots extending in opposite directions and merging at their inner ends with substantially circular openings adapted to receive and secure confronting links of a chain to be secured, one of the slots being made narrower than the other after the insertion of the links to be anchored therein, and restricting abutments on the inner edge of each hookline portion.

MICHAEL P. MARONG.